UNITED STATES PATENT OFFICE.

EUGEN BERLINER, OF MOSCOW, RUSSIA.

PROCESS OF EXTRACTING FATS, OILS, AND THE LIKE.

No. 878,930.  Specification of Letters Patent.  Patented Feb. 11, 1908.

Application filed November 19, 1907. Serial No. 402,815.

*To all whom it may concern:*

Be it known that I, EUGEN BERLINER, factory owner, a citizen of the Russian Empire, residing at Koschewniki, Bolschoi Troizkii pereulok, Moscow, Russia, have invented certain new and useful Improvements in Processes of Extracting Fats, Oils, and the Like; and I hereby declare that the following is a full, clear, and exact description of the same, such as will enable others skilled in the art to which the same appertains to practice and use the same.

This invention relates to processes of extracting fats, oils and the like; and comprises a method of extracting fats, oils and the like in which the raw material from which such oleaginous matter is to be extracted is preliminarily heated in a bath of like oleaginous matter until water and a portion of such oleaginous matter are removed and is finally extracted with a low-boiling solvent, such as, for instance, benzin; all as more fully hereinafter set forth and as claimed.

Low-boiling hydrocarbon fat solvents of the nature of benzin do not effectually extract fats from moist raw materials and as in practice raw materials are invariably moist to a greater or less extent, in the prior art it was necessary to continue the treatment with benzin until most, or all, of the moisture was removed before complete extraction of fat could be obtained. This removal of water, which takes place by a sort of evaporative action, is an exceedingly slow operation and unduly prolongs the extraction, and, furthermore, is detrimental both to the material under extraction and to the oleaginous matter extracted. Long heating, even at a low temperature, is as detrimental as a higher temperature for a shorter time, this being particularly the case with materials containing water since hot water acts on many substances besides fat; as, for instance, in the case of bones where the glue-forming bodies are partly dissolved and partly decomposed. Efforts to diminish this effect by accelerating the operation by use of higher temperatures have been found to injure the material more. And of course in either case, much heat is wasted.

The removal of the fat from dry material does not require a long time or an injuriously high temperature, nor is such required for removing residual solvent from the extracted material, especially when a low boiling solvent, such as benzin, and a vacuum are employed.

In the present invention, the crude material prior to the extraction is deprived of water by heating it in fat, oil or the like, of nature similar to the fatty bodies which are to be subsequently extracted; namely in animal fat such as bone fat or tallow when bones are to be treated, in rape seed oil when rape seed is to be treated. This fatty matter serves as a vehicle of heat in driving off the moisture. After the moisture is removed, the fatty heating bath is drawn off or otherwise separated, and the treated material extracted with a volatile solvent. The material being dry, extraction is rapid and complete, no great time or heat being required. In this heating in the fatty bath, much of the fatty matter in the raw material is dissolved by and passes into said bath and though some of the fatty matter of the bath passes into such material, experiments have shown that the gain is generally greater than the loss, the quantity of fatty matter in the bath drawn off from the treated material being increased. In drawing off, or otherwise separating, the bath should be as completely separated from the raw material as possible to avoid the use of unnecessarily large quantities of volatile solvent in the subsequent extraction.

Fats and oils obtained by the use of volatile solvents are apt to contain residual traces of such solvents, imparting to them some odor, which odor may be somewhat unpleasant in the case of such solvents as benzin, and are furthermore apt to be rather darker in color than similar fatty matters obtained by ordinary rendering (heating with water) or by expression. Fats and oils obtained by rendering processes and expression, because of their purity, absence of odor and light color are commercially rather more valuable than extracted fats and oils. Inasmuch as the fats obtained in heating the materials in a fatty bath as described, are like these natural fats in character it is therefore generally advisable to use such natural fats, that is fats obtained by rendering or expression, to form the fatty bath. On heating the raw material, such as bones, in a bath of rendered or expressed fat, such as tallow, the bath increases in quantity, as stated, and the increment is of as good character as the fat used.

Bones contain some tallow and in treating them, it is desirable to use a bath of rendered or expressed tallow in removing moisture, rather than a bath of bone oil, though the latter may, of course, be employed. The amount of tallow employed is increased in the operation, a valuable product being obtained, and such tallow as remains adhering or absorbed upon removal of the bath, contributes towards improving the quality of the bone oil later extracted.

In the treatment in the fatty bath to remove water, it is desirable to employ a vacuum as facilitating the expulsion of such moisture at a lower temperature.

In practical operation, treating bones, the bones are placed in an extractor, which may be of any of the ordinary types, together with the necessary amount of liquid bone fat or tallow, as the case may be. The charge is then heated to about 80° C., by steam coils or other suitable means, and a vacuum produced. Heating and vacuum are continued as long as steam is produced. After the moisture is completely evaporated, heating and vacuum are continued and the liquid fat, carrying with it, its fatty increment from the bones, is drawn off. A volatile fat solvent, such as benzin, is now introduced, either in the form of vapor or as liquid, and extraction performed in the regular manner. When the fat is extracted, any fat solvent carrying dissolved fat is removed from the extractor and residual solvent removed. This may be advantageously done with the aid of the vacuum producing apparatus, the heat still contained in the bones serving to volatilize such solvent. When the extraction is to be done with cold liquid solvent, the bones are heated in the last stage of the operation by the vapors of solvent in order that they may have the necessary amount of heat to volatilize the solvent when vacuum is applied. It is one of the advantages of the present operation that, water having been previously removed, the material may be extracted by such cold liquid solvents. The expulsion of water from the raw material by this preliminary heating in fat or oil much accelerates the extraction process proper since it is then merely necessary to remove fat and not fat and water, and also economizes in the amount of solvent required. And the raw material is much less affected; a matter of much importance in many cases, as, for instance, in the case of bones from which glue is to be later obtained.

The expulsion of moisture by the fatty bath is very quickly effected as the fatty matter acts as a quick heating agent and the heated moisture does not have time to injuriously affect the material. The fatty bath of course does not evaporate, fats and oils having relatively high boiling and decomposing point. The heat required is not great, it being necessary to heat merely a few degrees above the boiling point of water under the particular pressure employed. This pressure is advantageously less than atmospheric. The hot fat employed may be quickly and completely removed after the desiccation. As stated, its amount is generally found to be increased.

What I claim is:

1. In the manufacture of fats and oils, the process which comprises heating moist oleaginous material in a bath of like fatty matter to that contained in said material until the moisture is removed, aqueous vapors being removed as fast as formed.

2. In the manufacture of fats and oils, the process which comprises heating moist oleaginous material in a bath of like fatty matter to that contained in said material, said heating being done under less than atmospheric pressure and continued until the moisture is removed.

3. In the manufacture of fat from bones, the process which consists in heating bones in a bath of fatty matter until the moisture of the bones is expelled and then withdrawing said bath from the bones.

4. In the manufacture of fat from bones, the process which consists in heating bones in a bath of fatty matter under reduced atmospheric pressure until the moisture of the bones is expelled and then withdrawing said bath from the bones.

5. In the manufacture of fat from bones, the process which consists in heating bones in a bath of molten tallow until the moisture of the bones is expelled and then withdrawing said bath from the bones.

6. In the manufacture of fat from bones, the process which consists in heating bones in a bath of molten tallow under less than atmospheric pressure till the moisture of the bones is expelled and then withdrawing said bath from the bones.

7. In the manufacture of fats and oils, the process which comprises heating moist oleaginous material in a bath of fatty matter like to that contained in said material until the moisture is removed, withdrawing said bath from the material and extracting residual oleaginous matter with volatile solvent.

8. In the manufacture of fats and oils, the process which comprises heating moist oleaginous material in a bath of fatty matter like to that contained in said material until the moisture is removed, said heating being performed under less than atmospheric pressure, withdrawing said bath from the material and extracting residual oleaginous matter with volatile solvent.

9. In the manufacture of fat from bones, the process which consists in heating the bones in a bath of fatty matter until moisture is expelled, withdrawing the bath from the bones and extracting the bones with volatile solvent.

10. In the manufacture of fat from bones, the process which consists in heating the bones in a bath of tallow till moisture is expelled, withdrawing the bath from the bones and extracting the bones with volatile solvent.

11. In the manufacture of fat from bones, the process which consists in heating the bones in a bath of fatty matter under less than atmospheric pressure until moisture is expelled, withdrawing the bath and extracting the bones with volatile solvent.

12. In the manufacture of fat from bones, the process which consists in heating the bones in a bath of molten tallow under less than atmospheric pressure till moisture is expelled, withdrawing the bath and extracting the bones with volatile solvent.

In testimony whereof I have signed this specification in the presence of two subscribing witnesses.

EUGEN BERLINER.

Witnesses:
ALEXANDER HOUKEL,
GUSTAVE HARTWIG.